United States Patent
Neustadt

(10) Patent No.: US 9,815,078 B2
(45) Date of Patent: Nov. 14, 2017

(54) HOVERING DEVICE FOR DRAWING ON WALLS

(71) Applicant: Roi Neustadt, Tel Aviv (IL)

(72) Inventor: Roi Neustadt, Tel Aviv (IL)

(*) Notice: Subject to any disclaimer, the term of this patent is extended or adjusted under 35 U.S.C. 154(b) by 0 days.

(21) Appl. No.: 15/304,987

(22) PCT Filed: Apr. 22, 2015

(86) PCT No.: PCT/IL2015/050424
§ 371 (c)(1),
(2) Date: Oct. 18, 2016

(87) PCT Pub. No.: WO2015/162613
PCT Pub. Date: Oct. 29, 2015

(65) Prior Publication Data
US 2017/0209885 A1    Jul. 27, 2017

Related U.S. Application Data

(60) Provisional application No. 61/983,480, filed on Apr. 24, 2014, provisional application No. 62/053,842, filed on Sep. 23, 2014.

(51) Int. Cl.
*B05B 13/00* (2006.01)
*B64C 39/02* (2006.01)
(Continued)

(52) U.S. Cl.
CPC ............. *B05B 13/005* (2013.01); *B05C 1/06* (2013.01); *B64C 39/024* (2013.01); *B64D 1/18* (2013.01);
(Continued)

(58) Field of Classification Search
None
See application file for complete search history.

(56) References Cited

U.S. PATENT DOCUMENTS

| 6,419,190 B1* | 7/2002 | Nguegang | B05C 1/08 118/256 |
| 2015/0274294 A1* | 10/2015 | Dahlstrom | B64D 1/18 239/722 |

FOREIGN PATENT DOCUMENTS

| CN | 101317744 | 12/2008 |
| CN | 205493730 U * | 8/2016 |

(Continued)

OTHER PUBLICATIONS

International Search Report and Written Opinion for International Application No. PCT/IL2015/050424 filed Apr. 22, 2015.

*Primary Examiner* — Shelley Chen
(74) *Attorney, Agent, or Firm* — Dorsey & Whitney LLP

(57) ABSTRACT

A wall-drawing hovering device (WDHD) is provided. The WDHD comprises an unmanned helicopter configured and operable for flying and hovering while being disconnected from ground. The WDHD further comprises a mobilizing system comprising at least one motorized wheel. The mobilizing system is physically associated and carried with the unmanned helicopter and configured to drive the WDHD along a vertical surface when the WDHD hovers above ground. The WDHD further comprises a drawing system comprising a paint releasing member connected with a paint reservoir. The drawing system is carried with the unmanned helicopter and configured to controllably release paint from the paint reservoir through the paint releasing member. The WDHD is thereby configured to hover above ground next to a vertical surface such as a wall, so that the mobilizing system frictionally attaches to the vertical surface thereby enabling driving the WDHD along the vertical surface. The WDHD is further configured to draw on the vertical surface by controllably releasing paint from the paint releasing member.

21 Claims, 3 Drawing Sheets

(51) Int. Cl.
    *B64D 1/18*     (2006.01)
    *G05D 1/00*     (2006.01)
    *B05C 1/06*     (2006.01)

(52) U.S. Cl.
    CPC ...... *G05D 1/0094* (2013.01); *B64C 2201/027* (2013.01); *B64C 2201/108* (2013.01); *B64C 2201/12* (2013.01); *B64C 2201/146* (2013.01)

(56) References Cited

FOREIGN PATENT DOCUMENTS

| | | |
|---|---|---|
| DE | 202006013909 | 2/2007 |
| KR | 10-1128526 | 3/2012 |
| WO | WO 2015008312 A1 * | 1/2015 |

* cited by examiner

HOVERING DEVICE FOR DRAWING ON WALLS

FIELD OF THE INVENTION

The invention, in some embodiments, relates to the field of unmanned hovering devices, and more particularly, but not exclusively, to hovering devices used for drawing on walls.

BACKGROUND OF THE INVENTION

Graffiti, namely writing or drawing on walls or other objects, often in public areas or being exposed to the public eye, is a well known way of artistic expression. Graffiti is used for esthetical decoration of walls, fences, street objects such as garbage or recycling containers etc., or as means for publically—but often unanimously—protesting or expressing social, economical or other political views.

Graffiti is often performed by a lone performer with relatively simple tools. For example, a single spray-can may be all that is used to generate a complete graffiti artwork. As a result, when employed to walls, graffiti is often restricted to low-to-moderate heights, usually comparable to a man's height or such that may be reached with a simple ladder. Employing graffiti to walls at heights of more than a few meters above ground might either involve a considerable risk of fall injuries for the performer in case of an accident, or might require complex and fairly expensive equipment—such as a lift—and might further require complex coordination e.g. with municipal authorities, to enable the work using the public domain.

U.S. Pat. No. 6,419,190 discloses an airborne cleaning and painting robot having the capability to fly, and a cleaning or painting mechanism that can be located at various positions on the robot body. The robot comprises of a flying unit connected with a feeding tube to a ground-moving base that holds the pressurized cleaning solution or paint. A steering mechanism in contact with the surface being cleaned or painted for changing the direction of advance of the flying unit while a back propeller or main rotors push the flying body against the working surface. An array of sensors is mounted of the flying unit body to get the physical size of the working surface, avoid obstacles, maintain stability and control other critical characteristics.

Korean patent KR 1128526 discloses a cleaning robot for windows of a high-rise building, using propellers to increase the adhesion pressure onto window surface. The window cleaning robot has cleaning equipment arranged in space part of main body, and thrusting apparatus adhering two pairs of driving wheel, where cleaning surface is formed in both sides of main body.

Chinese patent CN101317744 discloses a wall surface cleaning robot based on the positive/negative pressure adsorption principle. A cleaning mechanism and a water inlet and outlet mechanism of the invention are installed in a shell body. A wheel type traveling system is installed at the lower part of the shell body. A three phase motor is installed on the upper end face of the shell body, equipped with a propeller and a centrifugal fan. A dry brush, a wet brush, a suction roll and a squeeze roll are installed in the shell body in sequence from front to rear.

SUMMARY OF THE INVENTION

Aspects of the invention, in some embodiments thereof, relate to unmanned hovering devices. More specifically, aspects of the invention, in some embodiments thereof, relate to hovering devices used for drawing on walls.

Radio controlled helicopters are used prolifically as toys. For example, qudrocopters such as Parrot AR.Drone 2.0 have four propellers that may provide high stability to the aircraft when in the air. Such a helicopter may include sensors for sensing the device orientation during hovering and flying, and an on-board processor that automatically provides commands or control signals to the propellers to maintain the helicopter stability. The helicopter may further comprise a radio receiver for receiving operational commands, intended to control the helicopter (descent, elevate, turn etc.), from an operator on the ground.

There is thus provided, according to an aspect of some embodiments, a wall-drawing hovering device (WDHD). The WDHD comprises an unmanned helicopter configured and operable for flying and hovering while being disconnected from ground. The WDHD further comprises a mobilizing system comprising at least one motorized wheel. The mobilizing system is physically associated and carried with the unmanned helicopter and configured to drive the WDHD along a vertical surface when the WDHD hovers above ground. The WDHD further comprises a drawing system comprising a paint releasing member connected with a paint reservoir. The drawing system is carried with the unmanned helicopter and configured to controllably release paint from the paint reservoir through the paint releasing member. The WDHD is thereby configured to hover above ground next to a vertical surface such as a wall, so that the mobilizing system frictionally attaches to the vertical surface thereby enabling driving the WDHD along the vertical surface. The WDHD is further configured to draw on the vertical surface by controllably releasing paint from the paint releasing member.

According to an aspect of some embodiments there is further provided a kit for a wall-drawing hovering device. The kit comprises a mobilizing system comprising a motorized wheel. The kit further comprises a drawing system comprising a paint releasing member connected with a paint reservoir, the drawing system being configured to controllably release paint from the paint reservoir through the paint releasing member. The kit further comprises a controller, functionally associated, for control, with the mobilizing system and with the drawing system. The kit is configured to be assembled onto an unmanned helicopter to produce a wall-drawing hovering device, the wall-drawing hovering device being thereby configured to drive along a vertical surface using the mobilizing system and to draw on the vertical surface by controllably releasing paint from the paint releasing member, when the unmanned helicopter hovers above ground.

According to an aspect of some embodiments there is further provided a computer executable program for use with a controller of a WDHD, wherein the controller is functionally associated for control with a mobilizing system and with a drawing system of the WDHD. The program is configured to receive operational commands for the WDHD from an operator, and to generate dedicated control commands for the mobilizing system and for the drawing system of the WDHD.

According to an aspect of some embodiments there is further provided a computer readable program storage device, storing the program described above.

Certain embodiments of the present invention may include some, all, or none of the above advantages. Further advantages may be readily apparent to those skilled in the art from the figures, descriptions, and claims included herein.

Aspects and embodiments of the invention are further described in the specification hereinbelow and in the appended claims.

Unless otherwise defined, all technical and scientific terms used herein have the same meaning as commonly understood by one of ordinary skill in the art to which this invention pertains. In case of conflict, the patent specification, including definitions, governs. As used herein, the indefinite articles "a" and "an" mean "at least one" or "one or more" unless the context clearly dictates otherwise.

Embodiments of methods and/or devices herein may involve performing or completing selected tasks manually, automatically, or a combination thereof. Some embodiments are implemented with the use of components that comprise hardware, software, firmware or combinations thereof. In some embodiments, some components are general-purpose components such as general purpose computers or processors. In some embodiments, some components are dedicated or custom components such as circuits, integrated circuits or software.

For example, in some embodiments, some of an embodiment may be implemented as a plurality of software instructions executed by a data processor, for example which is part of a general-purpose or custom computer. In some embodiments, the data processor or computer may comprise volatile memory for storing instructions and/or data and/or a non-volatile storage, for example a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results).

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative description and no attempt is made to show structural details of an embodiment in more detail than is necessary for a fundamental understanding of the invention. For the sake of clarity, some objects depicted in the figures are not to scale.

In the Figures.

DETAILED DESCRIPTION OF SOME EMBODIMENTS

Figure 1:
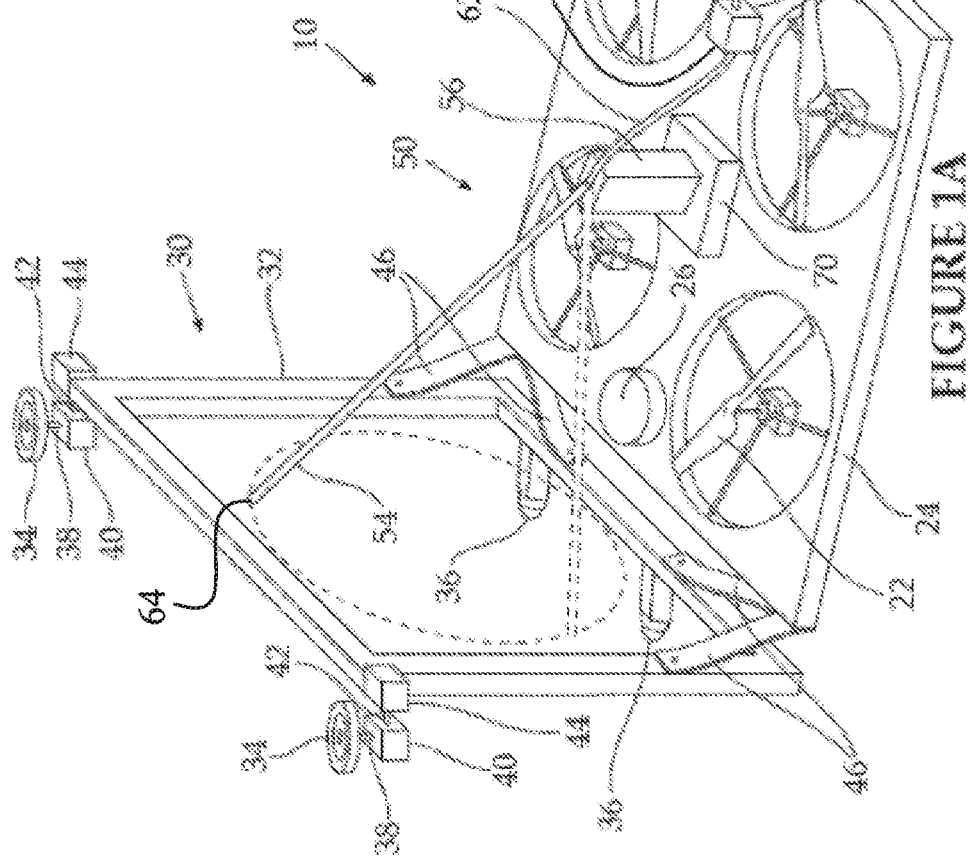
FIG. 1A schematically depicts an embodiment of a wall drawing hovering device, according to the teachings herein.
FIG. 1B schematically depicts a portion of the frame of the wall drawing hovering device of FIG. 1A, including a motorized wheel oriented for driving the wall drawing hovering device vertically.

The principles, uses and implementations of the teachings herein may be better understood with reference to the accompanying description and figures. Upon perusal of the description and figures present herein, one skilled in the art is able to implement the teachings herein without undue effort or experimentation. In the figures, like reference numerals refer to like parts throughout.

FIGS. 1A and 1B depict a wall drawing hovering device (WDHD) 10 according to an aspect of the invention. The wall drawing hovering device comprises a quadrocopter 20 comprising four propellers 22 held together by a structure 24, and a control unit 26 comprising sensors, a processor and a radio receiver, the control unit being functionally associated with the propellers to command them. When wall drawing hovering device 10 hovers, structure 24 is substantially horizontal.

The wall drawing hovering device further comprises a mobilizing system 30 configured for driving WDHD 10 along a vertical surface such as a wall when WDHD 10 hovers above ground. Mobilizing system 30 comprises a frame 32, configured to be parallel to a wall, namely to align vertically, when the wall drawing hovering device hovers. In wall drawing hovering device 10, frame 32 is substantially perpendicular to structure 24. Mobilizing system 30 further comprises two motor driven wheels 34 and two free-rotating ball joints 36 located on frame 32 and arranged to assist the wall drawing hovering device move along the wall.

When motor driven wheels 34 revolve while being pressed against a wall, the wall drawing hovering device is being driven along a trajectory on the wall which is substantially defined by the orientation of the revolution of the wheels. Motor driven wheels 34 have revolution axes 38 which coincide with respective rotating axes of driving motors 40. When driving motors 40 rotate, motor driven wheels 34 rotate also thereby driving WDHD 10 along a wall as described above. Driving motors 40 are fixed to orientation axes 42 of orientation servos 44. Orientation servos 44 may be commanded, as described in more detail further below, to rotate orientation axes 42 to a desired angle. Orientation servos 44 (and orientation axes 42) may be commanded, for example, to have an angle denoted as zero (0°) as schematically depicted in FIG. 1A, thereby setting revolution axes vertically and defining a substantially horizontal trajectory of WDHD 10 along a wall when motor driven wheels 34 revolve. Orientation servos 44 and orientation axes 42 may also be commanded, for example, to have an angle denoted as ninety degrees (90°) as schematically depicted in FIG. 1B, thereby setting the revolution axes horizontally and defining a substantially vertical trajectory of WDHD 10 along a wall when motor driven wheels 34 revolve. Likewise, orientation axes 42 may be set to any intermediate angle between zero and ninety degrees to select substantially any desired path along a wall. According to some embodiments, orientation axes 42 may be set to any intermediate angle between zero and one-hundred and eighty degrees to select substantially any desired path along a wall.

According to some embodiments, motor driven wheels 34 are made of a sticky material or the motor driven wheels are coated with a sticky layer, configured to weakly attach to the wall. Weakly attaching to the wall means that motor driven wheels 34, and therefore WDHD 10, are attached to the wall at a pre-defined force. The pre-defined force attaching WDHD 10 to the wall is configured to maintain contact of motor driven wheels 34 with the wall even when WDHD 10 is subject to drifting forces from the surroundings such as arbitrary air movements or wind. The pre-defined force is also weak enough to enable motor driven wheels 34 to revolve and hence drive WDHD 10 along the wall as described above. The pre-defined force is also weak enough to enable detachment of WDHD 10 from the wall using propellers 22, subject to a suitable command from the operator.

It is noted that a mobilizing system for WDHD 10 may be realized by various embodiments different from mobilizing system 30, as may be appreciated by a person skilled in the art. A suitable mobilizing system may comprise a single motor driven wheel, or two motor driven wheels (as described in FIGS. 1A and 1B) or three motor driven wheels, or even a higher number of motor driven wheels. Further, a single free rotating ball joint or two free rotating ball joints (as described in FIGS. 1A and 1B) or three or more free rotating ball joints may be used. Free rotating wheels which are arranged to have a free rotating axis of revolution—so as to allow the wheels to revolve along an arbitrary orientation—may be employed in some embodiments instead of free rotating ball joints. In preferred embodiments the total number of motor driven wheels and free rotating ball joints (or free rotating wheels) is three or more, arranged in vertical plane, so as to stably support the WDHD when driving along a vertical wall.

According to yet other embodiments, a mobilizing system for the WDHD comprises at least one caterpillar track, comprising a motor driven wheel, for driving the WDHD along a wall. Various embodiments comprising caterpillar tracks are contemplated. According to some embodiments a single caterpillar track (e.g. located at the center of the top arm of frame 32) is used for stabilizing and for driving the WDHD along the wall. According to some embodiments a single caterpillar track is used for driving the WDHD and two or more additional free rotating ball joints or wheels, arranged in a vertical plane with the caterpillar track, (e.g. at the locations of ball joints 36 in FIG. 1A) are used for stabilizing the WDHD on the wall. According to some embodiments a mobilizing system comprises two caterpillar tracks, each arranged e.g. at a top corner of frame 32 (i.e. instead of motor driven wheels 34). According to some embodiments two caterpillar tracks are arranged along the top arm and along the bottom arm of frame 32, respectively, being thereby configured to stabilize the WDHD on the wall (no free rotating ball joints or wheels are included) and to drive the WDHD in a substantially horizontal path. For a vertical travel the WDHD of this embodiment may use propellers 22 for elevation or descent, using increased or decreased elevation force, respectively. According to some embodiments the mobilizing system comprises two caterpillar tracks arranged horizontally for horizontal displacements (as described above) and two additional caterpillar tracks arranged vertically (e.g. each along one horizontal arm of frame 32) for vertical displacements of the WDHD. For driving horizontally the horizontal tracks are activated whereas the vertical tracks are dragged, and for driving vertically the vertical tracks are activated whereas the horizontal tracks are dragged along the wall. According to some embodiments which include four tracks arranged as described above, the activated tracks are protruded towards the wall, or the deactivated tracks are retreated away from the wall, so that only the activated tracks are in contact with the wall, and thereby avoiding the drag of the deactivated tracks.

Mobilizing system 30 is flexibly associated with quadrocopter 20. Specifically, frame 32 is connected with structure 24 via shock-absorbing members 46, wherein shock absorbing members 46 enable frame 32 to yield flexibly and to tilt flexibly relative to structure 24. Shock absorbing members 46 are also configured to absorb energy during such a tilt, thereby reducing an amount of energy that is transferred from frame 32 to structure 24 in case WDHD 10 collides with an object during flight. When WDHD 10 hovers, approaches and contacts a wall to be drawn upon, hitting the wall in a sudden might be detrimental to the quadrocopter balance in air. In other words, as a result from a sudden hit onto a wall the WDHD may lose balance and consequently lose elevation or even flip over and fall. Shock absorbing members 46 reduce shocks transferred from mobilizing system 30 to quadrocopter 20, and thereby assist in maintaining stability even in the moment of contacting a wall or a similar object.

Wall drawing hovering device 10 further comprises a drawing system 50, configured to draw on a vertical surface. Drawing system 50 comprises a paint reservoir 52 and a paint injector 54. Paint injector 54 is controllably movable by a servo mechanism 56, thereby being configured to inject paint in a desired direction. Paint injector 54 is associated with paint reservoir 52 via a pipe 58 and a paint pump 60. The paint pump may affect injections of paint by pressurizing paint through pipe 62 and through paint injector 54. According to some embodiments paint injector 54 comprises an injection aperture 64 enabling drawing system 50 to inject paint on a wall from a distance.

When the WDHD hovers adjacent to a wall, the wheels 34 and the ball joints 36 substantially contact the wall. During hover the propellers 22 generate an upwards thrust to maintain a required elevation force for the WDHD. When a helicopter without frame 32 is adjacent to a wall, pressure gradients and air streams around the WDHD may lead to instability, causing it e.g. to flip or turn over, or stick to the wall in a vertical orientation (that is to say, that structure 24 is not horizontal, and may even be vertical), lose elevation and fall down. The frame 32 prevents such flipping and assists in maintaining the WDHD in operative orientation even when contacting the wall. Frame 32 further establishes a fixed distance of the paint injector from the wall, whereas friction of the wheels with the wall assists in stabilizing the WDHD 10 relative to the wall.

By commanding driving motors 40 of the motor-driven wheels 34, the operator may command the WDHD to move controllably along the wall in a desired path. Axes 38 of the wheels may be oriented vertically for selecting a horizontal path, or the axes may be oriented horizontally, as schematically depicted in FIG. 1B, for selecting a vertical path, or the axes may be oriented in any intermediate orientation for selecting another path. The propellers 22 provide the necessary force to maintain the wheels in contact with the wall and to provide the required friction between the wheels 34 and the wall. Travelling along the wall as described above may in some embodiments require coordinated operation of the propellers 22 and the motor driven wheels. For example, travelling upwards may be accomplished by suitably driving the wheels 34, together with applying more elevation force (compared to hovering at a fixed altitude) using propellers 22.

For drawing on the wall, drawing system 50 may be employed. According to some embodiments, WDHD 10 may hover still in one place against the wall, while paint injector 54 injects paint to desired locations on the wall, thus drawing a drawing or a segment of a drawing. After drawing such a segment, WDHD 10 may be driven to a next location on the wall using motor driven wheels 34, stabilize in place, where a new segment may then be drawn.

As is detailed and described herein below, embodiments of the WDHD of the current invention may be controlled manually, so that a user on the ground commands flight activity and drawing steps using e.g. a radio control system.

Some embodiments may be entirely autonomous so that a WDHD may draw a complete picture on a wall automatically. Some embodiments of the current invention may have partial autonomous capability so that some operations during a drawing session of drawing a picture are performed automatically, whereas some operations should be performed manually.

Mobilizing system 30 and drawing system 50 may be functionally associated with a drawing controller 70. According to some embodiments drawing controller 70 may be associated with a radio receiver (not shown) on WDHD 10 for receiving operational commands from a user on the ground for commanding mobilizing system 30 and drawing system 50. In some such embodiments a user may operate WDHD and command it to draw an image or a segment of an image by separately commanding movements of paint injector 54 and activation of paint pump 58. Likewise, a user may command mobilizing system 30 to displace WDHD 10 on the wall from one location to another location by commanding orientation servos 44 towards a desired direction followed by commanding driving motors 40 so as to activate a displacement of WDHD 10 along a desired travel length.

According to some embodiments drawing controller 70 may include a computer configured for storing a sequence of commands for mobilizing system 30 and for drawing system 50. According to some embodiments such a computerized controller may transfer such a sequence of commands for execution by mobilizing system 30 and drawing system 50 according to a pre-programmed schedule.

According to some embodiments a computerized controller of WDHD 10 may be programmed to generate a sequence of commands for mobilizing system 30 and/or for drawing system 50 from a single operational command provided by the user. In other words, the computerized controller may be configured to translate, or to compile, an operational command of an operator into a sequence of commands executable by mobilizing system 30 and/or for drawing system 50. For example, the computerized controller may be programmed to generate suitable sequences of commands for mobilizing system 30 and for drawing system 50 for drawing pre-defined symbols or image segments. For example, the computerized controller may be programmed to translate e.g. a single operational command (given by the operator) to draw on a wall the letter "A" with a selected font and at a selected size, to a sequence of commands for mobilizing system 30 and for drawing system 50 that would affect drawing of a corresponding "A" on the wall.

According to some embodiments mobilizing system 30 and drawing system 50 may be separately commercialized as a kit adapted to be assembled onto an unmanned helicopter such as quadrocopter 20. According to some embodiments, such a kit may be specifically adapted and suitable for an unmanned helicopter of a specific manufacturer and of a specific model. According to some embodiments such a kit is adapted to have a total weight that may be lifted and carried by the unmanned helicopter according to the manufacturer's specifications of the helicopter. According to some embodiments assembly of the kit onto the unmanned helicopter may comprise a step of disassembling parts of the unmanned helicopter. According to some embodiments the kit may further comprise a controller configured to be functionally associated with the mobilizing system and with the drawing system of the kit, for commanding them. According to some embodiments the controller may comprise a computer, being thereby configured to be programmed and/or to store sequences of executable commands for the mobilizing system and/or for the drawing system of the kit, and/or to store sequences of operational commands provided by the operator, as described above. According to some embodiments a kit comprising a mobilizing system, a drawing system and a computerized controller may further comprises a computer readable data storage device such as a CD or a flash memory device. According to some embodiments the storage device may store a computer executable program configured to allow a user to generate and store on a computer's memory a sequence of executable commands for the mobilizing system and/or for the drawing system. According to some embodiments the storage device may store a computer executable program configured to generate sequences of such commands for mobilizing system 30 and/or for drawing system 50 from single operational commands provided by the user.

Various embodiments of WDHD 10 comprising various configurations of controller 70 are contemplated. According to some embodiments controller 70 is carried on WDHD 10 as it hovers above ground. In such embodiments, commands from an operator on the ground may be received by controller 70 via a radio communication channel arranged to have a radio transmitter on the ground (with the operator), whereas a radio receiver, having a radio communication channel with the radio transmitter, is disposed on WDHD 10. According to some embodiments an operator may provide to a computerized controller (namely a controller such as controller 70 further comprising a computer as described above) operation commands over a radio communication channel, and the computerized controller may interpret the operation commands into executable commands for the mobilizing system and the drawing system. According to some embodiments a computer of a computerized controller may be located on the ground to be activated by the operator. The computer may generate and send (e.g. over the radio communication channel with the WDHD) commands to affect the mobilizing system and/or the drawing system.

According to some embodiments of WDHD 10 controller 70 may be functionally associated with quadrocopter 20 for controlling the flight thereof. Controller 70 may be associated with sensors of quadrocopter 20 such as gyroscopes and altitude sensors for receiving therefrom momentary flight characteristics. Controller 70 may further be associated with propellers 22 for controlling flight maneuvers of WDHD 10. According to some embodiments a computerized controller of WDHD 10 (namely controller 70 with a computer) may be programmed to generate sequences of commands for components and modules of WDHD 10 (such as data reading commands to sensors and activation and control commands to propellers 22) from single operational commands provided by the user. For example, a single operational command intended to affect WDHD to approach and contact a wall to be drawn upon, may be translated to a sequence of commands intended to affect such an approach towards the wall, as is detailed below.

According to some embodiments of methods of operating WDHD 10, approaching a wall and contacting the wall may be obtained by employing a pre-defined motion profile, namely by approaching the wall at a pre-defined velocity so as to maintain stability at all times. Since a vertical wall may affect, in the vicinity of the wall, air streams and pressure gradients generated by the propellers of the quadrocopter, stability of WDHD 10 might be compromised if it does not approach the wall using a suitable motion profile. Also, bumping of the WDHD onto the wall may need to be soft enough so as not to disturb its balance in the air. According to some embodiments approaching the wall may be accomplished by a decreasing-speed motion profile, so that the WDHD decreases its speed towards the wall as the distance to the wall decreases. According to some embodiments approaching the wall is accomplished in a series of leaps and pauses, each leap bringing the WDHD closer to the wall and each pause allows it to regain stability after the leap. Thus, according to some embodiments, the computerized controller may be programmed to translate an operational command (given by the operator) to approach the wall, and given an input parameter such as a distance of the WDHD to the wall, to a sequence of commands to components and modules of quadrocopter 20 (e.g. the propellers 22) to affect an approach towards the wall employing pre-defined motion profile and related pre-defined displacement moves in the air.

Figure 2:
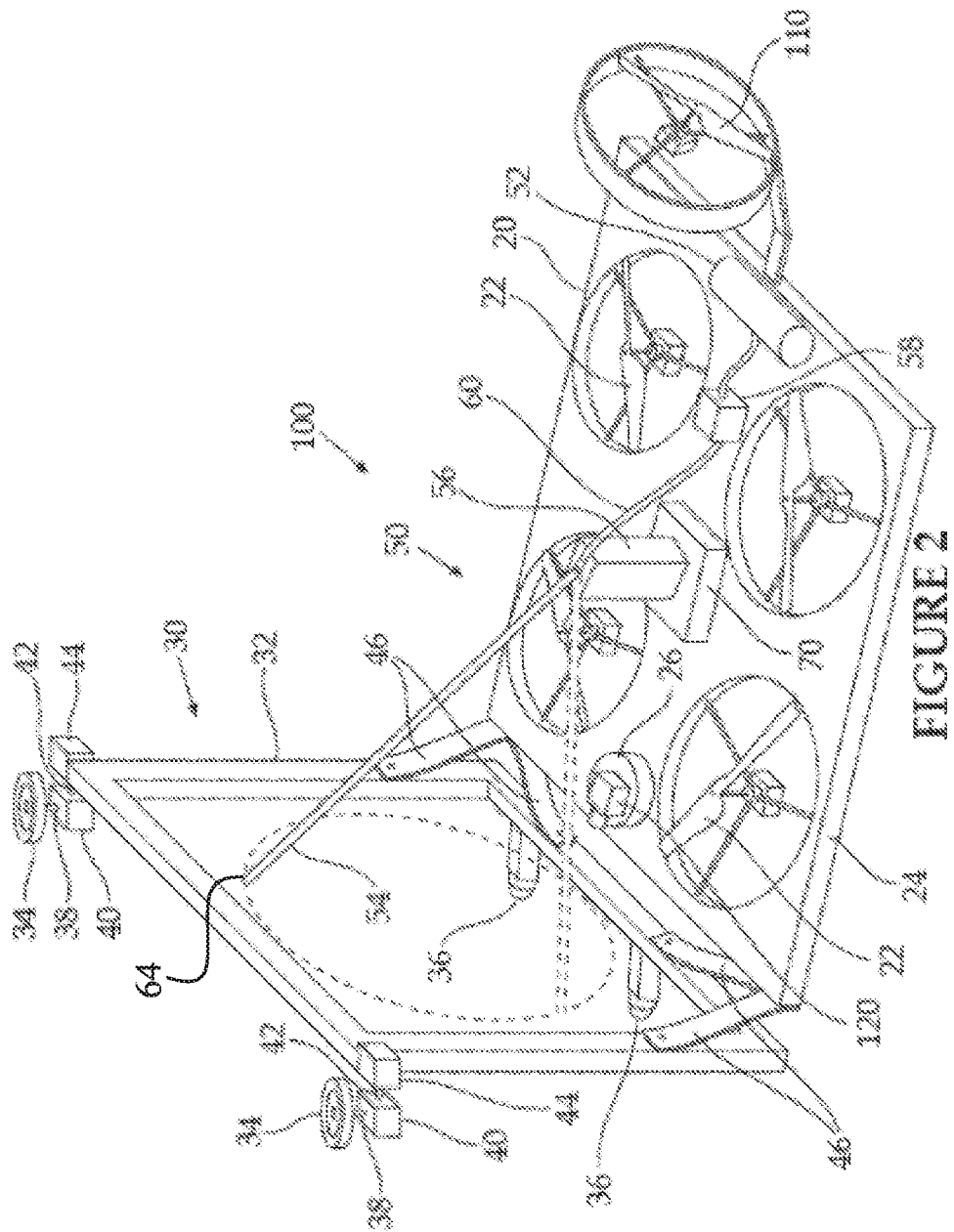
FIG. 2 schematically depicts another embodiment of a wall drawing hovering device, according to the teachings herein, and FIG. 3 schematically depicts another embodiment of a wall drawing hovering device, according to the teachings herein.

FIG. 2 schematically depicts a WDHD 100 according to an aspect of some embodiments. WDHD 100 is different from WDHD 10 in that WDHD 100 further comprises a back propeller 110 aligned and configured to generate a horizontal thrust. By providing a horizontal thrust (specifically, thrust in the forward or backward direction), propeller 110 may provide WDHD 100 an additional degree of freedom in maneuver and increased stability compared to WDHD 10 described above. When WDHD 100 hovers above ground facing a wall to be drawn on, so that frame 32 is aligned substantially vertically, next to the wall and parallel to the wall, propeller 110 may be employed to propel WDHD 100 towards the wall, thereby increasing the pressure of driving wheels 34 on the wall, increasing the friction between driving wheels 34 and the wall, and increasing stability WDHD 100 when attached to the wall and when driving along the wall. Propeller 110 may further be used to approach the wall (when providing a forward thrust) and to retreat from the wall (by providing a backward thrust) thus avoiding the need to employ propellers 22 for such maneuvers and thereby contributing to increase the stability of WDHD 100.

WDHD 100 further comprises a forward-looking sensor 120, functionally associated with computerized controller 70 and configured to sense objects located in the forward direction of WDHD 100 namely in the direction of frame 32. According to some embodiments forward-looking sensor 120 comprises a distance sensor such as a sound or an ultrasound distance sensor, configured to sense a distance from the sensor to an object located in front thereof. According to some embodiments, a distance sensor may be employed for providing a velocity of WDHD 100 towards an object such as a wall, by measuring the distance to the object as a function of time using forward-looking sensor 120, by providing the distance measurements to a processor such as computerized controller 70, and by employing the processor to differentiate, with respect to time, the distance function.

According to some embodiments forward-looking sensor 120 may comprises a camera, e.g. a stills camera or a video camera, for producing images of the forward direction of WDHD 100. According to some embodiments, images of the forward direction of WDHD 100 may be employed for imaging a wall to be drawn on prior to the drawing process, during the drawing process—once or more than once—and for imaging the drawing on the wall after drawing is complete. Images of the drawing may be provided to computerized controller 70 for storage in a computer's memory and/or for analysis, e.g. for quality analysis of the drawing, by comparing an image to be drawn (stored in the computer's memory) and an image of the drawing on the wall. According to some embodiments, forward looking sensor 120 may be aligned in any desired direction, that is to say a distance sensor may be employed to obtain the distance to an object at any direction from the WDHD, or a camera may be employed to collect images from any desired direction relative to the WDHD.

According to some embodiments, a computerized controller 70 may be programmed to enable WDHD 10 (or WDHD 100) to draw, autonomously and automatically, a complete picture on a wall. According to some embodiments a complete image (denoted I) may be stored in a computer's memory, and a dedicated program may be used to construct a drawing schedule for the WDHD for drawing the image. The schedule may include the required sequence of commands for the propellers 22, for the motor driven wheels 34, for the drawing system 50, and for related modules of the WDHD, such commands being executed in synchronization, to complete the whole drawing.

For example, computerized controller 70 may be programmed to store an image I desired to be drawn in the computer's memory. In a next step, the computer may decompose the image I to a series of image segments $I_n$ according to pre-defined rules. The rules may be composed, inter alia according to specific operation capabilities of the WDHD, to allow an efficient or otherwise desired drawing process by drawing the image segments $I_n$ one after the other. For example, each image segment $I_n$ may include a single virtual image layer, each virtual image layer comprising a single image component including a single color of the image. Thus, in such example, a two-color image may have two image layers and two corresponding image segments $I_n$, allowing the WDHD, e.g., to draw a first layer of the whole image using a first color, and then draw a second layer of the whole image, using a second color, thus completing drawing the image I. In another example, an image I may be decomposed to areal segments $I_n$, each segment being dimensioned so that WDHD 10 is capable of drawing the segment $I_n$ while hovering still in air, solely by manipulating paint injector 54. The whole image I may thus be drawn by drawing the image segments $I_n$ one after the other, properly bordering one another so as to form the whole picture corresponding to image I on the wall. According to yet another example a combination of the decomposition schemes described above may be used, namely decomposing an image I to image layers and further decomposing each layer to areal segment $I_n$.

According to some embodiments, in a next step after decomposing an image I according to such pre-defined rules, a sequence of commands may be generated that automatically allow WDHD 10 to lift off from ground; approach the wall and attach to it; draw the series of image segments $I_n$ one after the other by suitably activating the mobilizing system, the drawing system and possibly quadrocopter 20; and land back on ground. According to some embodiments of drawing automatically a complete picture using WDHD 100, a method of drawing may further comprise a step of imaging the drawing on the wall using camera 120; a step of comparing the imaged picture I', obtained by camera 120 to the image I, and optionally modifying the drawing on the wall by drawing corrections thereon, according to differences between I and I'.

Figure 3:
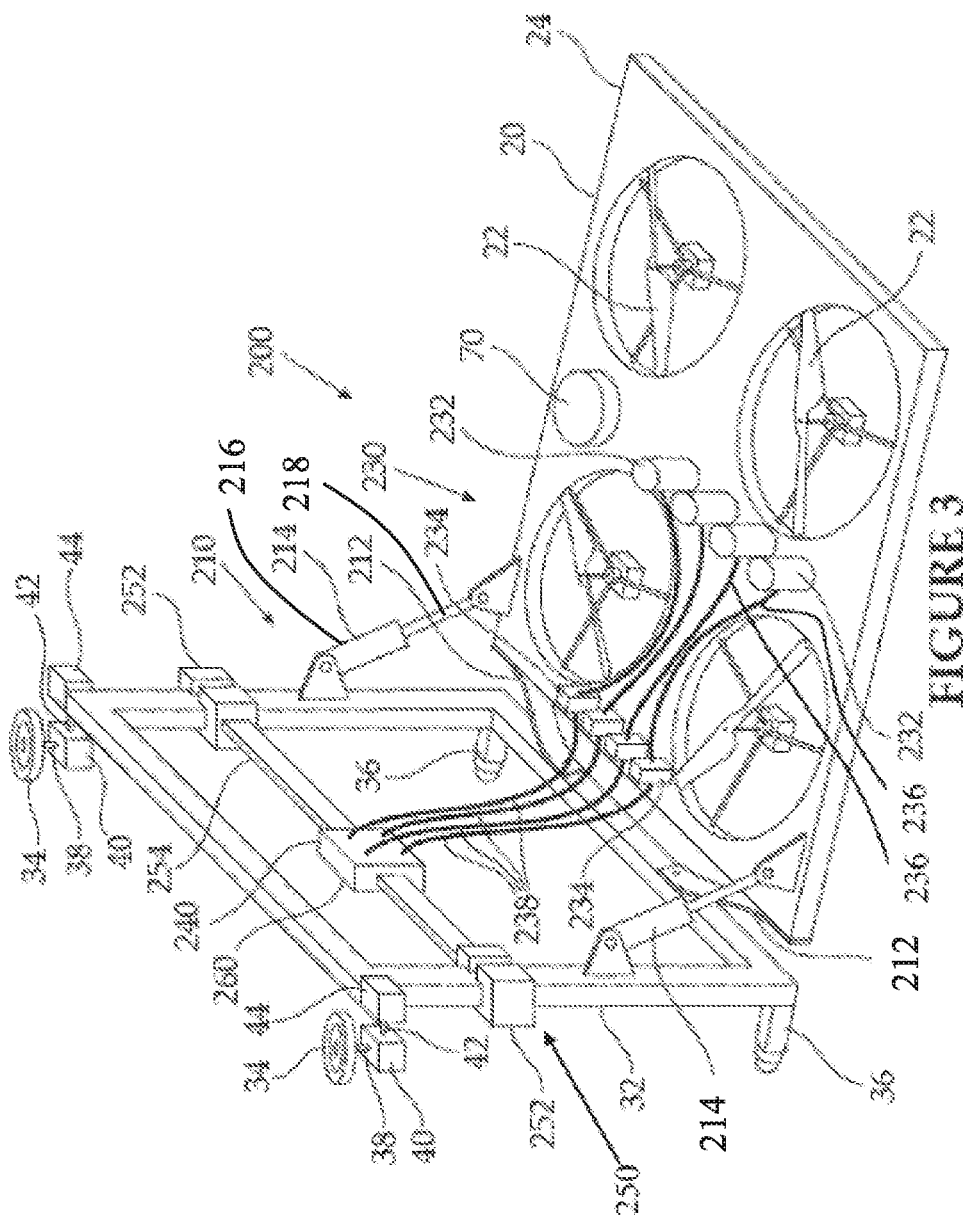

FIG. 3 schematically depicts a WDHD 200 according to an aspect of some embodiments. WDHD 200 is different from WDHD 10 in having a tiltable mobilizing system 210 instead of mobilizing system 30 in WDHD 10. Tiltable mobilizing system 210 is configured to tilt controllably relative to quadrocopter 20, thereby enabling attaching WDHD 200 to surfaces that are tilted from the vertical.

For suitably driving along a surface such as a wall, frame 32 must be substantially parallel to the surface so that two driving wheels 34 and two free rolling ball joints 36 frictionally revolve along the surface. To suitably attach to a non-vertical surface, while structure 24 is aligned substantially horizontal to allow WDHD 200 to hover stably above ground, frame 32 is tilted to align parallel to the non-vertical surface, thereby allowing driving wheels 34 and ball joints 36 to attach to the surface. Frame 32 is tiltable relative to structure 24 about shock absorbers 212, wherein shock absorbers 212 flexibly connect frame 32 to structure 24. WDHD 200 further comprises tilt manipulators 214 configured to tilt frame 32 relative to structure 24. Tilt manipulators 214 comprise controllable actuators 216 and arms 218 associated with controllable actuators 216, enabling together to controllably tilt frame 32 relative to structure 24. Tilt manipulators 214 are functionally associated with computerized controller 70, for enabling commanding tilt manipulators 214 to affect a tilt of frame 32 relative to structure 24.

WDHD 200 is further different from WDHD 10 in comprising a multi-color drawing system 230 instead of drawing system 50. Multi-color drawing system 230 comprises four paint reservoirs 232, each paint reservoir 232 being associated with a paint pump 234 via a pipe 236. Paint pumps 234 are associated with a drawing head 240 via pipes 238, for pressurizing paint from paint reservoirs 232 to drawing head 240. Drawing head 240 is thereby configured to release on a wall that WDHD is suitably attached to, paint pressurized by paint pumps 234. Embodiments of the current invention comprising more than four different colors and embodiments comprising less than four different colors are contemplated.

Writing head 240 is associated with an X-Y scanning mechanism 250, enabling controllably displacing writing head 240 in X-Y type displacements, substantially between the arms of frame 32. Scanning mechanism 250 comprises two vertical carriages 252 attached to the two side arms of frame 32, respectively, being configured to slide along the two vertical arms. Vertical carriages 252 are connected to one another by a horizontal rail 254 so that horizontal rail 254 may displace together with vertical carriages 252. A horizontal carriage 260 is attached to horizontal rail 254, being configured to slide along vertical rail 254. X-Y scanning mechanism 250 is functionally associated with controller 70, for commanding displacements of vertical carriages 252 and of horizontal carriage 260. Writing head 240 is disposed on horizontal carriage 260, being hereby configured to be controllably displaced in X-Y type displacements, optionally by commanding vertical carriages 252, together with rail 254, to displace in Y type displacements along the side arms of frame 32, and commanding horizontal carriage 260 to displace along rail 254 in X-type displacements. When, during operation, frame 32 is suitably positioned attached to a surface and parallel to the surface, writing head 240 maintains a fixed distance from the surface, enabling a high-quality drawing or painting on the surface.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. No feature described in the context of an embodiment is to be considered an essential feature of that embodiment, unless explicitly specified as such.

Although steps of methods according to some embodiments may be described in a specific sequence, methods of the invention may comprise some or all of the described steps carried out in a different order. A method of the invention may comprise all of the steps described or only a few of the described steps. No particular step in a disclosed method is to be considered an essential step of that method, unless explicitly specified as such.

Although the invention is described in conjunction with specific embodiments thereof, it is evident that numerous alternatives, modifications and variations that are apparent to those skilled in the art may exist. Accordingly, the invention embraces all such alternatives, modifications and variations that fall within the scope of the appended claims. It is to be understood that the invention is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the invention. Section headings are used herein to ease understanding of the specification and should not be construed as necessarily limiting.

The invention claimed is:

1. A wall-drawing hovering device (WDHD), comprising:
an unmanned helicopter configured and operable for flying and hovering while being disconnected from ground;
a mobilizing system comprising a motorized wheel, said mobilizing system being physically associated and carried with said unmanned helicopter and configured to drive said WDHD along a vertical surface when said unmanned helicopter hovers above ground; and
a drawing system comprising a paint releasing member connected with a paint reservoir, said drawing system being carried with said unmanned helicopter and configured to controllably release paint from said paint reservoir through said paint releasing member;
wherein said wall-drawing hovering device is configured to hover above ground next to a vertical surface so that said mobilizing system frictionally attaches to the vertical surface thereby enabling driving said wall-drawing hovering device along the vertical surface, said WDHD being further configured to draw on the vertical surface by controllably releasing paint from said paint releasing member.

2. The WDHD of claim 1 wherein said motorized wheel of said mobilizing system is configured to frictionally attach to the vertical surface, thereby enabling driving said WDHD along the vertical surface.

3. The WDHD of claim 2 wherein said motorized wheel is configured to controllably turn while revolving, thereby enabling turning said WDHD towards a desired direction while driving along the vertical surface.

4. The WDHD of claim 1, further comprising tilt manipulators associated with said mobilizing system and with said unmanned helicopter, being thereby configured to controllably tilt said mobilizing system relative to said unmanned helicopter.

5. The WDHD of claim 1 wherein said paint releasing member comprises a paint injector configured to inject paint through an aperture.

6. The WDHD of claim 1 wherein said paint releasing member comprises a paint head configured to paint a surface by contacting the surface.

7. The WDHD of claim 1 further comprising a controller functionally associated with said mobilizing system and with said drawing system, for controlling said mobilizing and drawing systems.

8. The WDHD of claim 7 further comprising a radio communication system comprising a transmitter located on ground and a receiver carried on said unmanned helicopter and configured to provide a radio communication channel between said transmitter and said receiver.

9. The WDHD of claim 8 wherein said controller is functionally associated with said mobilizing system and with said drawing system via said radio communication channel.

10. The WDHD of claim 7 wherein said controller is functionally associated with said unmanned helicopter for controlling flight of said WDHD, said controller comprises a computerized controller configured to store commands suitable for commanding said mobilizing system and said drawing system and further configured to execute such commands according to a pre-programmed schedule.

11. The WDHD of claim 10 wherein said computerized controller is programmed to receive an image as an input data, and to generate a schedule comprising a sequence of commands for drawing the image by said WDHD.

12. The WDHD of claim 1 wherein said unmanned helicopter comprises a propeller aligned to generate thrust in a substantially horizontal direction.

13. A kit for a wall-drawing hovering device (WDHD), comprising
a mobilizing system comprising a motorized wheel;
a drawing system comprising a paint releasing member connected with a paint reservoir, configured to controllably release paint from said paint reservoir through said paint releasing member; and
a controller, functionally associated, for control, with said mobilizing system and with said drawing system;
said kit being configured to be assembled onto an unmanned helicopter to produce said WDHD, said WDHD being configured to drive along a vertical surface using said mobilizing system and to draw on the vertical surface by controllably releasing paint from said paint releasing member, when said unmanned helicopter hovers above ground.

14. The kit of claim 13 further comprising a radio communication system comprising a transmitter located on ground and a receiver carried on said unmanned helicopter and configured to provide a radio communication channel between said transmitter and said receiver.

15. The kit of claim 14 wherein said controller is functionally associated with said mobilizing system and with said drawing system via said radio communication channel.

16. The kit of claim 13 wherein said controller comprises a computerized controller configured to store commands suitable for commanding said mobilizing system and said drawing system, said controller further configured to execute such commands according to a pre-programmed schedule.

17. The kit of claim 16 wherein said computerized controller is functionally associated with said unmanned helicopter for controlling flight of said WDHD.

18. A computer executable program for use with a controller of a wall-drawing hovering device, the controller being functionally associated for control with a mobilizing system and with a drawing system of said WDHD, wherein the program is configured to receive operational commands for said WDHD from an operator, and to generate dedicated control commands for said mobilizing system and for said drawing system of said WDHD.

19. The program of claim 18 being further configured to generate dedicated control commands to said unmanned helicopter for controlling flight of said WDHD.

20. The program of claim 18 being further configured to receive an image as input data, and to generate therefrom a series of image segments suitable for drawing by said WDHD.

21. The program of claim 20 being further configured to generate a schedule comprising a sequence of commands suitable for commanding said mobilizing system and said drawing system for drawing the image by said WDHD.

* * * * *